(12) United States Patent
Shelke

(10) Patent No.: US 9,624,907 B2
(45) Date of Patent: Apr. 18, 2017

(54) VELOCITY GRADIENT FLOATING TURBINE AND POWER GENERATION SYSTEM AND METHODS THEREOF

(76) Inventor: Dattatraya Rajaram Shelke, Riagad (IN)

( * ) Notice: Subject to any disclaimer, the term of this patent is extended or adjusted under 35 U.S.C. 154(b) by 434 days.

(21) Appl. No.: 14/344,512

(22) PCT Filed: Sep. 12, 2012

(86) PCT No.: PCT/IB2012/054730
§ 371 (c)(1),
(2), (4) Date: Apr. 3, 2014

(87) PCT Pub. No.: WO2013/038340
PCT Pub. Date: Mar. 21, 2013

(65) Prior Publication Data
US 2014/0230421 A1    Aug. 21, 2014

(30) Foreign Application Priority Data

Sep. 13, 2011  (IN) .......................... 2568/MUM/2011

(51) Int. Cl.
| | |
|---|---|
| *F16D 31/02* | (2006.01) |
| *F03D 9/00* | (2016.01) |
| *F03B 13/00* | (2006.01) |
| *F03B 17/06* | (2006.01) |
| *F03D 9/17* | (2016.01) |

(Continued)

(52) U.S. Cl.
CPC .............. *F03D 9/001* (2013.01); *F03B 13/00* (2013.01); *F03B 17/062* (2013.01); *F03B 17/063* (2013.01); *F03D 9/002* (2013.01); *F03D 9/008* (2013.01); *F03D 9/17* (2016.05); *F05B 2240/13* (2013.01); *F15B 11/06* (2013.01); *F15B 11/064* (2013.01); *Y02E 10/28* (2013.01); *Y02E 10/72* (2013.01); *Y02E 60/15* (2013.01)

(58) Field of Classification Search
CPC ........ F03D 9/17; F03B 17/062; F03B 17/063; F15B 11/064
USPC .......................................... 60/407, 408, 412
See application file for complete search history.

(56) References Cited

U.S. PATENT DOCUMENTS

| | | | |
|---|---|---|---|
| 5,946,909 A | 9/1999 | Szpur | |
| 2012/0119503 A1* | 5/2012 | van Breems | ............ F03B 13/14 290/55 |

FOREIGN PATENT DOCUMENTS

| | | |
|---|---|---|
| CA | 2 340 463 A1 | 9/2002 |
| CN | 1186163 A | 7/1998 |
| CN | 102128141 A | 7/2011 |

(Continued)

*Primary Examiner* — Thomas E Lazo
*Assistant Examiner* — Daniel Collins
(74) *Attorney, Agent, or Firm* — Sughrue Mion, PLLC

(57) ABSTRACT

The present invention in a preferred embodiment provides systems and methods for a velocity gradient floating turbine and power generation, comprising:
 a) a floating platform;
 b) guide vanes;
 c) a velocity gradient turbine;
 d) a gas compressor;
 e) a means to couple turbine and compressor, further comprising a turbine gear and a compressor gear or belt/chain drive;
 f) at least a pipe; and
 g) a turbine—generator sub-system;
wherein the said floating platform comprises:
 i. at least two tanks;
 ii. at least a rod to support the said tanks; and
wherein the said turbine—generator sub-system comprises:
(Continued)

i. a turbine ; and
ii. a generator.

9 Claims, 6 Drawing Sheets

(51) Int. Cl.
*F15B 11/06* (2006.01)
*F15B 11/064* (2006.01)

(56) References Cited

FOREIGN PATENT DOCUMENTS

| | | | |
|---|---|---|---|
| GB | 2 426 294 | A | 11/2006 |
| JP | 58-192976 | A | 11/1983 |
| MX | 2007002519 | A | 9/2008 |

* cited by examiner

VELOCITY GRADIENT FLOATING TURBINE AND POWER GENERATION SYSTEM AND METHODS THEREOF

This is a National Stage of International Application No. PCT/IB2012/054730 filed Sep. 12, 2012, claiming priority based on Indian Patent Application No. 2568/MUM/2011 filed Sep. 13, 2011, the contents of all of which are incorporated herein by reference in their entirety.

FIELD OF THE INVENTION

The present invention relates to the field of velocity gradient floating turbine and power generation system and methods thereof, utilizing energy from flow of a fluid or fluids.

BACKGROUND OF THE INVENTION

Today's limited coal and extinguishing fuel resources have led to a greater need for exploiting renewable energy resources. Tidal energy, wave energy, water power or similar forms of mechanical energy of a fluid system are few of the alternative renewable energy resources that can be used.

Despite numerous advantages offered by mechanical energy of a fluid system, the systems used therein have various problems including
 a) causing damage to the environment including fish and plant damage or migration,
 b) deposits such as silt or mud, on the machines used in such system,
 c) blockages caused in the machines used due to waste and sewage
 d) damage occurring to machines or their parts due to water flow.

Over the years, barrages or dams have been adapted typically to convert this energy into electricity by forcing the water through turbines and activating a generator. However, since such barrages and dam systems are rare and man-made, huge capital and maintenance is required to operate them, and the rare availability of such sites leads to escalation of expenditure. There may also be losses due to long transmission of power in such systems.

It is well known that water sources such as oceans, sea, rivers, lakes, creeks, ponds, canals and others are naturally available in abundant and are wide spread. However, comparative to dams (fams) and barrages there are limited systems in the art which can be used effectively for such water sources, and more so in low flow rate currents as well as high flow rate currents, and thereby leading to less effective and sporadic generation of power.

In another aspect of the background of this invention, it is observed that systems involving use of turbine for utilizing mechanical energy of a fluid system to generate power is a common practice as seen in the art. However, the design and working of said most of the know methods in the art fail to overcome the above mentioned problems.

In another aspect of the background of this invention, it has been also observed that the velocity of upper layers of flowing water is high as compared to lower layers. Velocity gradient is present in flow of the water, which further limits the vertical length of turbine thus may reduces the efficiency of the turbine. So there is need to construct vertical axis turbines in accordance with velocity gradient, for better efficiency of the turbine.

Attempts have been made to overcome the above mentioned problems, wherein a piston-like or similar arrangement is used to compress the air and such compressed air is used for power generation. However, in comparison to turbine based systems these systems may have several shortcomings such as:
 a) pistons may be comparatively more costly,
 b) mechanical parts of the piston are prone to wear and tear,
 c) maintenance costs may be high, and
 d) may not be used where the water flow rate is substantially low.

The present invention provides alternative to similar systems and methods in the art and also may be cost effective and efficient. In its various embodiments, present invention also addresses the above mentioned and other possible drawbacks and limitations of the currently used systems and methods relating to the field of velocity gradient floating turbine and the power generation system and methods thereof.

SUMMARY OF THE INVENTION

The present invention in a preferred embodiment provides systems and methods for a velocity gradient floating turbine and power generation, comprising:
 a) a floating platform;
 b) guide vanes;
 c) a velocity gradient turbine;
 d) a gas compressor;
 e) a means to couple turbine and compressor, further comprising a turbine gear and a compressor gear or belt/chain drive;
 f) at least a pipe; and
 g) a turbine—generator sub-system;
wherein the said floating platform comprises of
 i. at least two tanks;
 ii. at least a rod to support the said tanks; and
wherein the said turbine—generator sub-system comprises of
 i. a turbine; and
 ii. a generator; and
wherein the said tanks are connected to each other by the said guide vanes; and
wherein a conical passage is formed between the adjacent tanks; and
wherein the connecting corners of the said adjacent tanks are indented forming a hollow space in between the said adjacent tanks; and
wherein the said velocity gradient turbine is placed within the said hollow space; and
wherein the said rod is fixed at least at one end to a fixing body, and the said rod restricts the horizontal movement of the said tanks while allows the vertical movement of the said tanks; and
wherein the said platform can be locked and unlocked with the said plurality of vertical rods by suitable means at any position with respect to rise and fall in the fluid level; and
wherein a central shaft of the said velocity gradient turbine is linked to the said turbine gear and the said gas compressor is linked to the said compressor gear and both the said gears are operationally linked to each other; and
wherein flow of the fluid causes blades of the said velocity gradient turbine to rotate, and the rotation of the said turbine rotates the turbine gear, which enables compressor gear to rotate and initiates the gas compression process by the said gas compressor and the compressed gas is encompassed in the said tanks; and wherein the compressed gas reaches the said turbine—generator sub-system through the said pipe causing the rotation of the said turbine coupled to a generator and initiate the process of generating power.

BRIEF DESCRIPTION OF THE ACCOMPANYING DIAGRAMS

DETAILED DESCRIPTION OF THE INVENTION

Figure 1:
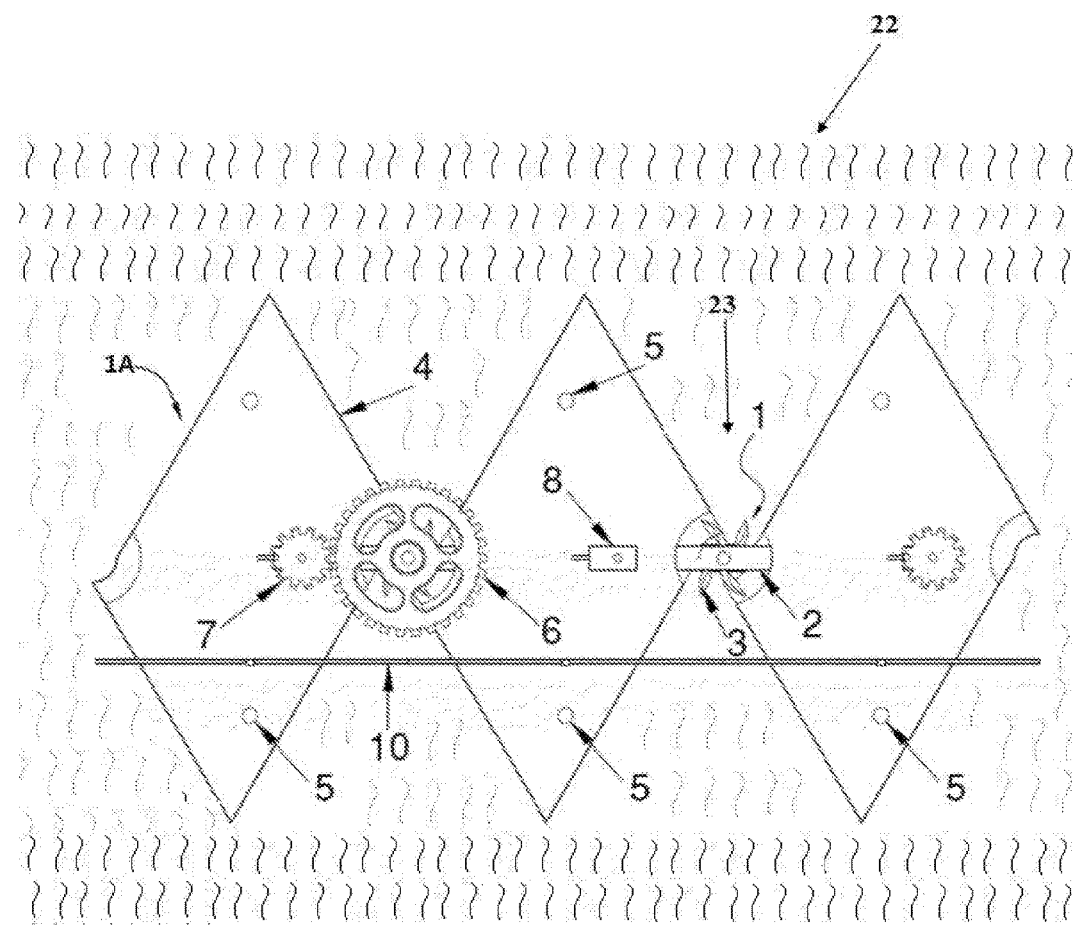
FIG. 1 represents the diagrammatic example of top view of one of the embodiments of the invention.

The present invention in a preferred embodiment provides systems and methods for a velocity gradient floating turbine and power generation, comprising:
a) a floating platform;
b) guide vanes;
c) a velocity gradient turbine;
d) a gas compressor;
e) a means to couple turbine and compressor, further comprising a turbine gear and a compressor gear or belt/chain drive;
f) at least a pipe; and
g) a turbine—generator sub-system;
wherein the said floating platform comprises:
  i. at least two tanks;
  ii. at least a rod to support the said tanks; and
wherein the said turbine—generator sub-system comprises:
  i. a turbine; and
  ii. a generator; and
wherein the said tanks are connected to each other by the said guide vanes; and
wherein a conical passage is formed between the adjacent tanks; and
wherein the connecting corners of the said adjacent tanks are indented to form a hollow space in between the said adjacent tanks; and
wherein the said velocity gradient turbine is placed within the said hollow space; and
wherein the said rod is fixed at least at one end to a fixing body, and the said rod restricts the horizontal movement of the said tanks while allows the vertical movement of the said tanks;
wherein the said platform can be locked and unlocked with the said rod by suitable means at any position with respect to rise and fall in the fluid level; and
wherein a central shaft of the said velocity gradient turbine is linked to the said turbine gear and the said gas compressor is linked to the said compressor gear and both the said gears are operationally linked to each other; and wherein flow of the fluid causes blades of the said velocity gradient turbine to rotate, and the rotation of the said turbine rotates the turbine gear, which enables compressor gear to rotate and initiates the gas compression process by the said gas compressor and the compressed gas is encompassed in the said tanks; and
wherein the compressed gas reaches the said turbine—generator sub-system through the said pipe causing the rotation of the said turbine coupled to a generator and initiate the process of generating power.

In an embodiment of the invention, a method of working of velocity gradient floating turbine and power generation, comprising the steps of
a. flowing of fluid into a conical passage formed between two adjacent floating tanks;
b. guiding of the fluid flow on to concave side of blades of the velocity gradient turbine by guide vanes;
c. rotating the velocity gradient turbine by the fluid flow,
d. rotating of a turbine gear which further rotates a compressor gear;
e. compressing the air by the gas compressor;
f. encompassing of the compressed gas in the tanks;
g. flowing of the compressed gas through a pipe to a turbine—generation sub-system;
h. rotating the turbine of the turbine—generation sub-system by the compressed gas; and
i. initiating power generating process.

In an embodiment of the invention, floating tanks are buoyant and upper surfaces of floating tanks are just above fluid level.

In an embodiment of the invention, blades of a velocity gradient floating turbine are concave and are wider at top than at bottom.

In an embodiment of the invention, a velocity gradient floating turbine and power generation system further comprises a wind turbine optionally mounted on the said tank and connected to a gas compressor through a gear wherein the said wind turbine rotates due to the flow of the wind.

In an embodiment of the invention, a velocity gradient turbine is any suitable turbine such as but not limited to steam turbines, gas turbines, transonic turbines, contra—rotating turbines, statorless turbine, ceramic turbine, shrouded turbine, shroudless turbine, bladeless turbine, water turbine, wind turbine, curtis turbine, rateau turbine, or any combinations thereof.

In an embodiment of the invention, a turbine being a water turbine is any suitable turbine such as but not limited to pelton turbine, francis turbine, kaplan turbine, turgo turbine and class flow turbine, or any combinations thereof.

In an embodiment of the invention, a turbine of a turbine—generator sub-system, is any suitable turbine such as but not limited to steam turbines, gas turbines, transonic turbines, contra—rotating turbines, statorless turbine, ceramic turbine, shrouded turbine, shroudless turbine, bladeless turbine, water turbine, wind turbine, curtis turbine, rateau turbine, or any combinations thereof.

In an embodiment of the invention, a gas compressor is any suitable gas compressor, such as but not limited to positive displacement compressor, dynamic compressor, rotary compressor, reciprocating compressor, axial compressor, centrifugal compressor, lobe compressor, screw compressor, liquid ring compressor, scroll compressor, vane compressor, diaphragm compressor, double acting compressor, single acting compressor, or any combinations thereof.

In an embodiment of the invention, gas compressed by an action of gas compressor may be coupled to any turbine—generator sub-system.

In an embodiment of the invention, floating tanks, rods, guide vanes, blades of turbine, a pipe can be simultaneously or independently made of the material such as but not limited to metallic, non-metallic materials, plastic, mica, ceramic, rubber, vinyl, leather, glass, cotton, wool, silk, nylon, polymer, metals, non-metals, super alloys, products, mixtures, alloys of the said materials, or any combinations thereof.

In an embodiment of the invention, a transverse cross-section of tanks may be of any suitable shape such as but not limited to circular, oval, elliptical, square, triangular, rectangular, pentagonal, polygonal, any of the n-sided polygon, where n=3 to infinity (infinity corresponds to a circle), closed wavy, irregular, or any combinations thereof.

In an embodiment of the invention, tanks may be of any suitable transverse cross-sectional size.

In an embodiment of the invention, rod supporting the tanks may be an elongated body, wherein the rod is of a suitable length such that the length and thickness, and wherein the cross-section of the rod may be of any suitable shape such as but not limited to circular, oval, elliptical, square, triangular, rectangular, pentagonal, polygonal, any of the n-sided polygon, where n=3 to infinity (infinity corresponds to a circle).

In an embodiment of the invention, a fixing body may be any suitable body such as but not limited to sea bed, river bed, canal bed, estuary bed, lake bed, bridge, arch, bond, branch, catwalk, connection, extension, gangplank, link, overpass, platform, pontoon, scaffold, span, tie, transit, trestle, viaduct, wing, lighthouse, ship, boats, or any combinations thereof.

In an embodiment of the invention, a valve may be situated at the intersection, where a pipe is connected to a floating tank.

In an embodiment of the invention, a valve situated at the intersection, where pipe is connected to a floating tank and the valve is any suitable valve such as but not limited to ball valve, butterfly valve, control valve, globe valve, needle valve, check valve, clack valve, non-return valve, one-way valve, tap valve, control valves, directional control valve, one-way valve, two-way valve, three-way valve, four-way valve, zone valve, reed valve or any combinations thereof.

In an embodiment of the invention, the assembly may further comprise of a controller selected from a group of controllers such as but not limited to;
a) a computerized sensor wherein the sensor senses the fluid level and automatically adjusts the height of floating tanks in such a way that the floating tank's upper surface is above the fluid level;
b) a Programmable Logic Controller (PLC) or a Proportional-Integral-Derivative controller (PID controller) to control the operations;
c) a control panel or user interface comprising of but not limited to pressure gauges to detect pressure of compressed gas in tanks and in a pipe, a gauge to detect the revolution per minute (RPM) of a turbine, a gauge to detect the pressure generated by compressed gas on a turbine of the turbine—generator sub-system, a device to read the power producing capacity and a battery to store the power;

In an embodiment of the invention, the compressed gas produced by the action of gas compressor in accordance with the invention may be used for other applications as well.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiments illustrated. The use of "including", "comprising" or "having" and variations thereof herein is meant to encompass the items listed thereafter and equivalents thereof as well as additional items.

For the purpose of this invention the term "indented" means any indented surface which may be a section of closed structures whose transverse cross-section may be of any suitable shape such as but not limited to circular, oval, elliptical, square, triangular, rectangular, pentagonal, polygonal, any of the n-sided polygon, where n =3 to infinity (infinity corresponds to a circle), closed wavy, irregular, or any combinations thereof.

For the purpose of this invention the term "conical passage" deems to include any passage formed due to the convergence of the walls of the two adjacent tanks; wherein the fluid enters through the mouth of the passage which is broader compared to the end which is narrower. The said passage merges with the hollow space creating a bottleneck.

In an embodiment of the invention, one or more of a process or step carried out by the system may involve use of a electronic device or a data processing device or a sensor or a microcontrollers or a PLC (Programmable logic controller) or a PID (proportional-integral-derivative) controller, or a combination thereof, which may further involve one or more predefined algorithms or programs or logic.

In an embodiment of the invention, the component or the parts of the system may be coated, painted or colored with a suitable chemical to retain or improve its properties, or to improve the aesthetics or appearance.

In an embodiment of the invention, the components of the present invention may be connected or arranged by using any suitable method and may include without limitation use of one or more of welding, adhesives, riveting, fastening devices such as but not limited to screw, nut, bolt, hook, clamp, clip, buckle, nail, pin, ring.

In accordance with an exemplary embodiment of this invention, FIG. 1 depicts a representation of top view or vertical axis of floating platform (1A) along with turbine (1). The floating tanks (4) are held or supported by the plurality of rods/beams/columns (5). Two adjacent tanks having concave conical corners are connected to each other by connecting rods (2) fixed at the top and bottom and a pipe (10) is connected to the floating tanks (4). A gas compressor (8) is coupled to turbine (1) having turbine blades (3) through a compressor gear (7) and turbine gear (6). Flowing of fluid (22) into the conical passage (23) causes blades (3) of the turbine (1) to rotate, and the rotation of the turbine rotates the turbine gear (6), which enables compressor gear (7) to rotate and initiates a gas compression process by the gas compressor (8) to produce compressed gas.

Figure 2:
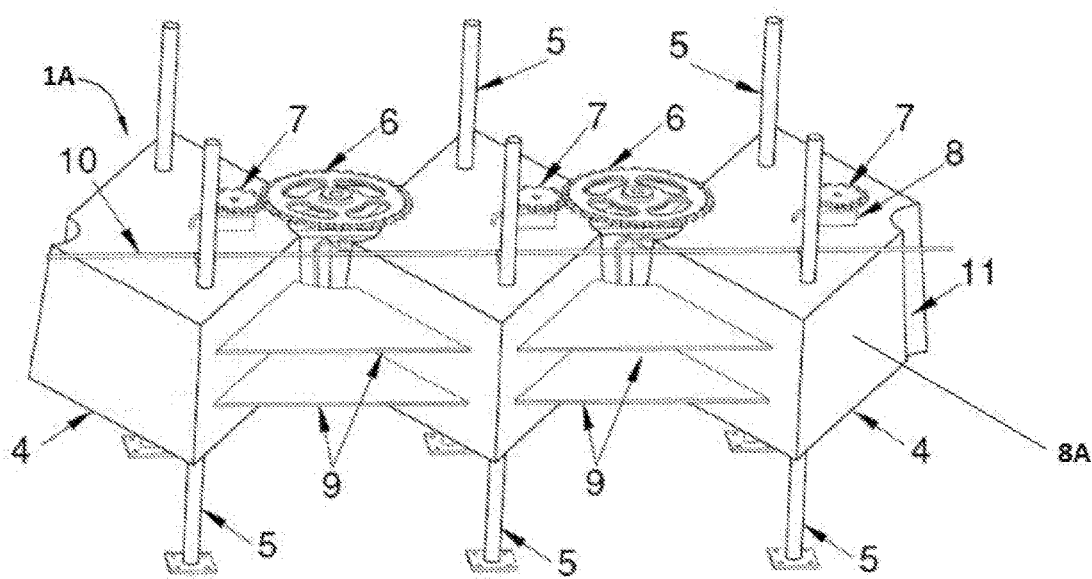
FIG. 2 represents the diagrammatic example of three dimensional view of one of the embodiments of the invention.

In accordance with another exemplary embodiment of this invention, FIG. 2 depicts representation of three dimensional view of a velocity gradient floating turbine system having a floating platform (1A) comprising floating tanks (4) held or supported by the plurality of rods/beams/columns (5). Two adjacent tanks having concave conical corners are connected to each other by guide vanes (9) and the connecting corners of the said tanks are concaved forming a hollow conical space (11) and a pipe (10) is connected to the floating tanks (4). A central shaft of the said velocity gradient turbine is operationally connected to a gas compressor (8) through a turbine gear (6) and compressor gear (7). Flow of fluid thorough the turbine causes rotation of the turbine gear (6), which enables compressor gear (7) to rotate and initiates a gas compression process by the gas compressor (8) to produce compressed gas. Thus produced compressed gas (8A) is encompassed in the floating tanks (4).

Figure 3:
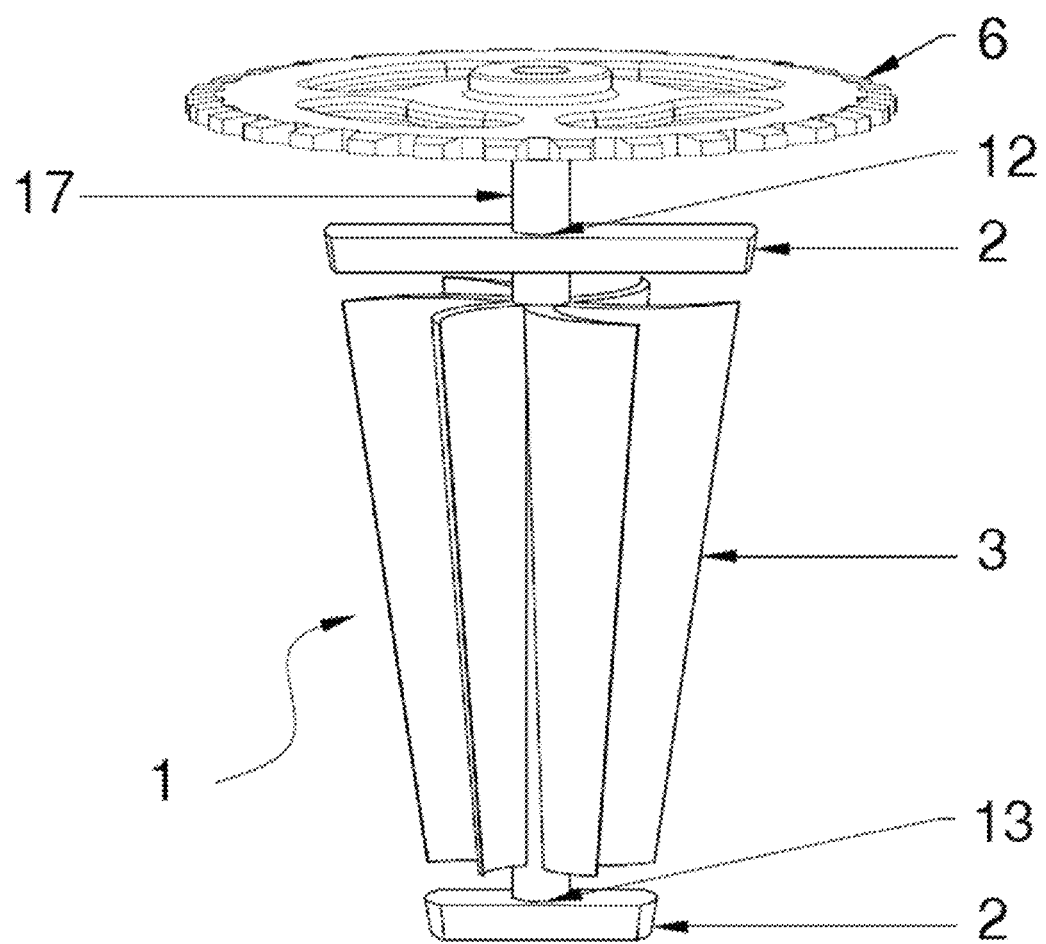
FIG. 3 represents the diagrammatic example of side view of velocity gradient turbine in one of the embodiments of the invention.

In accordance with another exemplary embodiment of this invention, FIG. 3 depicts a representation of side view of turbine (1) with turbine blades (3) a central shaft (17) having top bearings (12) & bottom bearings (13), and said bearings operationally supported by said connecting rods (2). A central shaft (17) of the said velocity gradient turbine is operationally connected to a gas compressor through a turbine gear (6).

Figure 4:
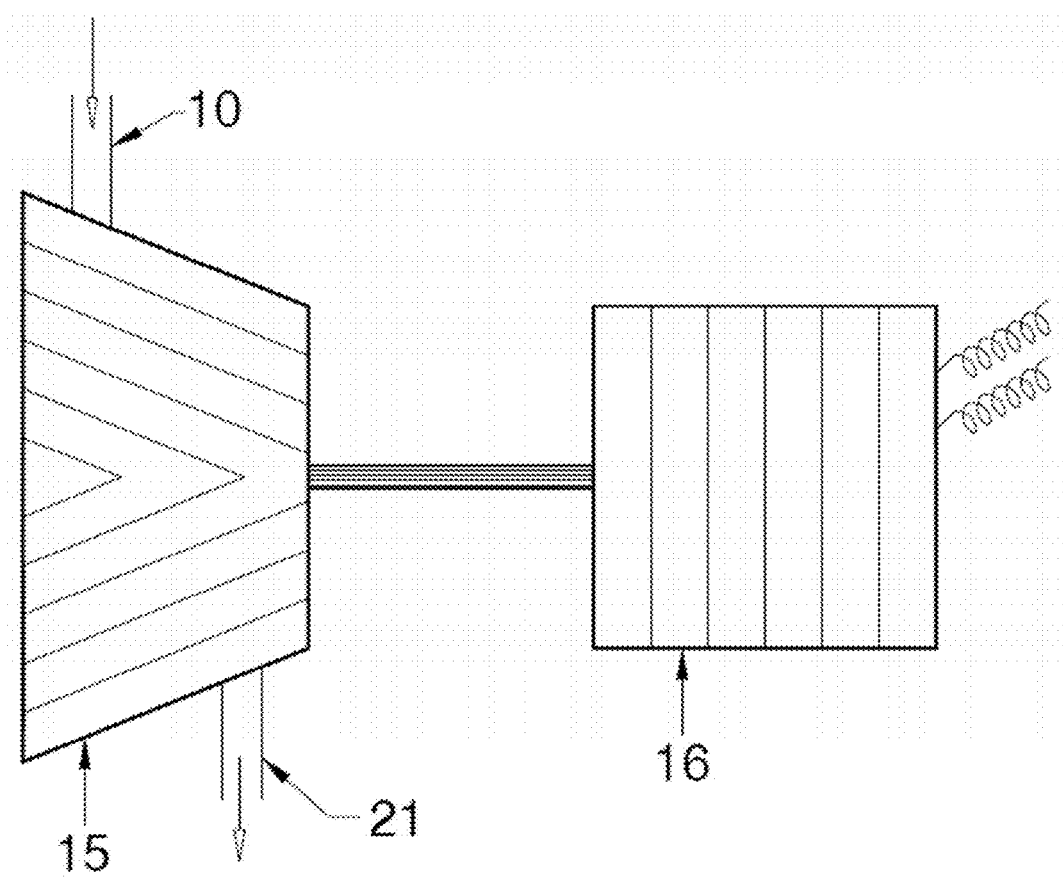
FIG. 4 represents the diagrammatic example of side view of an arrangement of turbine and generator in one of the embodiments of the invention.

In accordance with another exemplary embodiment of this invention, FIG. 4 depicts a representation of an arrangement of turbine and a generator of a turbine—generator sub-system. Compressed air reaches the said turbine—generator sub-system through a pipe (10) causing the said turbine (15) connected to the said generator (16) to rotate and generate electricity and a pipe (21) is connected to the system for disposal of exhaust gas.

Figure 5:
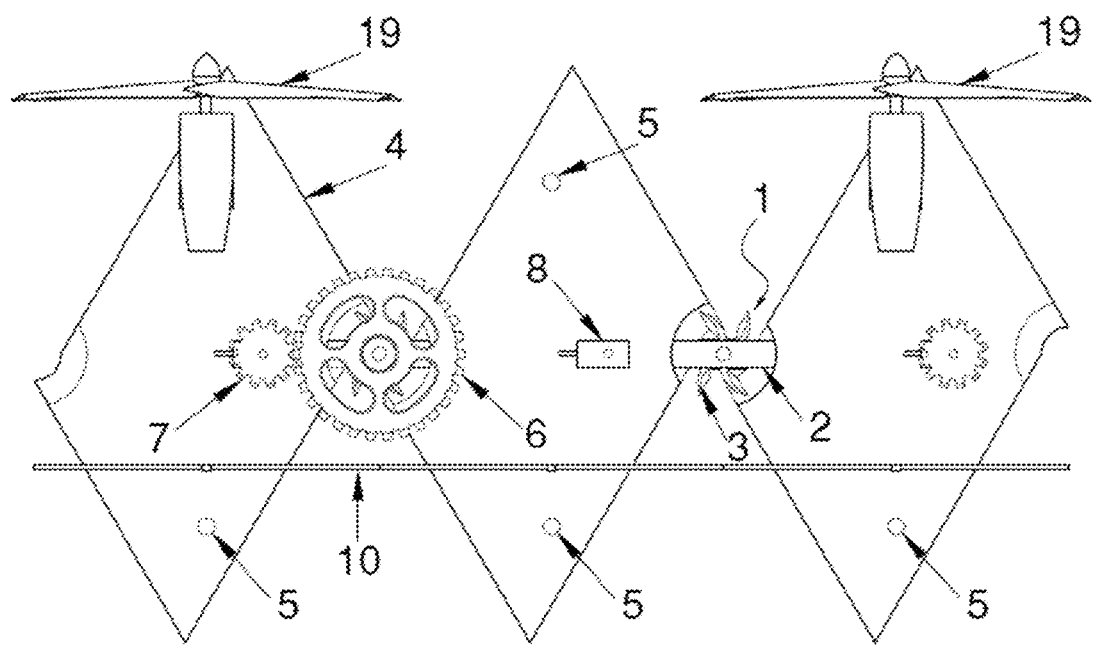
FIG. 5 represents the diagrammatic example of top view of one of the embodiments of the invention coupled to a wind turbine.

In accordance with an exemplary embodiment of this invention, FIG. 5 depicts a representation of top view or vertical axis of floating platform, wherein a wind turbine (19) has been mounted on the said floating tanks (4). Floating tanks (4) are held or supported by the plurality of rods/beams/columns (5). Two adjacent tanks having concave conical corners are connected to each other by connecting rods (2) fixed at top and bottom and a pipe (10) is connected to the buoyant floating tanks (4). A gas compressor (8) is coupled to turbine (1) having turbine blades (3) through a compressor gear (7) and turbine gear (6).

Figure 6:
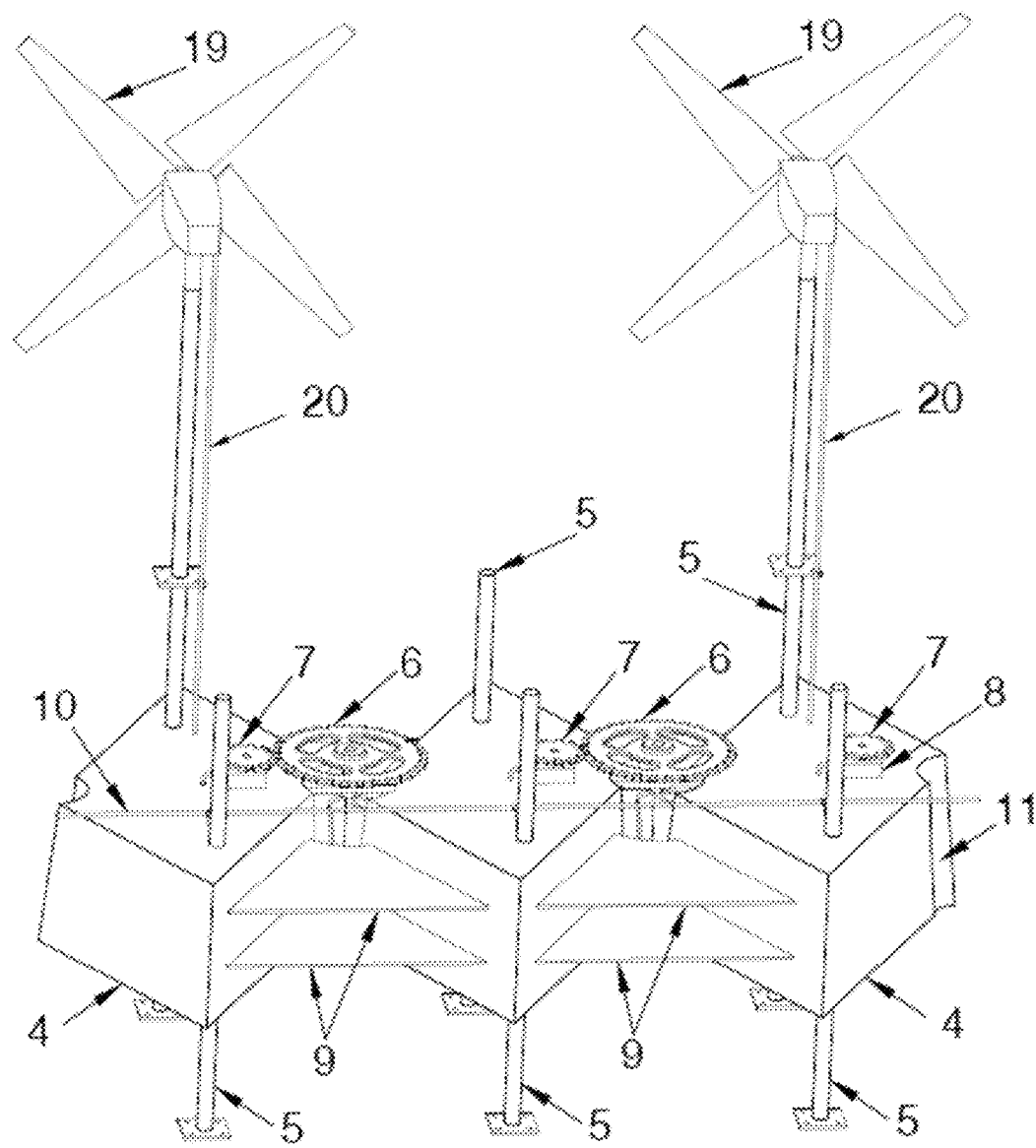
FIG. 6 represents the diagrammatic example of three dimensional view of one of the embodiments of the invention coupled to a wind turbine.

In accordance with another exemplary embodiment of this invention, FIG. 6 depicts representation of three dimensional view of a floating platform wherein a wind turbine (19) has been mounted on the said floating tanks (4) and connected to a gas compressor through a gear, wherein the said wind turbine rotates due to the flow of the wind and initiates the gas compression process by the said gas compressor and the compressed gas is encompassed in the said tanks through connecting pipe (20). Floating tanks (4) are held or supported by the plurality of rods/beams/columns (5). Two adjacent tanks having concave conical corners are connected to each other by guide vanes (9) and the connecting corners of the said tanks are concaved forming a hollow conical space (11). A pipe (10) is connected to the floating tanks (4).The central shaft of the said velocity gradient turbine is operationally connected to a gas compressor (8) through a turbine gear (6) and compressor gear (7).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" or "comprising," when used in this specification, specify the presence of stated features, integers, steps, operations, elements, or components, but do not preclude or rule out the presence or addition of one or more other features, integers, steps, operations, elements, components, or groups thereof.

Furthermore, this invention may, however, be embodied in many different forms and should not be construed as limited to the embodiments or examples set forth herein. Rather, these embodiments or examples are provided so that this disclosure will be thorough and complete, and will fully convey the scope of the invention to those skilled in the art Like reference numerals refer to like elements throughout the description of the figures or diagrams. It will be understood that when an element is referred to as being "connected" or "coupled" to another element, it can be directly connected or coupled to the other element or intervening elements may be present. In contrast, when an element is referred to as being "directly connected or coupled" to another element, there are no intervening elements present. Furthermore, "connected" or "coupled" as used herein may include wirelessly connected or coupled. As used herein, the term "and/or" includes any and all combinations of one or more of the associated listed items.

The aim of this specification is to describe the invention without limiting the invention to any one embodiment or specific collection of features. Person skilled in the relevant art may realize the variations from the specific embodiments that will nonetheless fall within the scope of the invention.

It may be appreciated that various other modifications and changes may be made to the embodiment described without departing from the spirit and scope of the invention.

I claim:

1. A velocity gradient floating turbine and power generation system, comprising:
   a) a floating platform;
   b) guide vanes;
   c) a velocity gradient turbine;
   d) a gas compressor;
   e) a means to couple said velocity gradient turbine and said gas compressor, further comprising a turbine gear and a compressor gear or belt/chain drive;
   f) at least a pipe; and
   g) a turbine—generator sub-system;
   wherein said floating platform comprises:
   i. at least two tanks;
   ii. at least a rod to support said at least two tanks; and
   wherein said turbine—generator sub-system comprises:
   i. a turbine ; and
   ii. a generator; and
   wherein said at least two tanks are positioned adjacent to each other and are connected to each other by said guide vanes, and wherein said at least two tanks comprise connecting corners; and
   wherein a conical passage is formed between the adjacent tanks; and
   wherein the connecting corners of said adjacent tanks are indented to form a hollow space in between said adjacent tanks; and
   wherein said velocity gradient turbine is placed within said hollow space; and
   wherein said rod is fixed at least at one end to a fixing body, and said rod restricts the horizontal movement of said at least two tanks while allows the vertical movement of said at least two tanks;
   wherein a central shaft of said velocity gradient turbine is linked to said turbine gear and said gas compressor is linked to said compressor gear and both said gears are operationally linked to each other; and
   wherein flow of a fluid causes blades of said velocity gradient turbine to rotate, and the rotation of said turbine rotates the turbine gear, which enables compressor gear to rotate and initiates a gas compression process by said gas compressor to produce compressed gas; and
   wherein the compressed gas is encompassed in said at least two tanks; and
   wherein the compressed gas reaches the said turbine—generator sub-system through said pipe causing the rotation of said turbine coupled to a generator and initiate the process of generating power.

2. The velocity gradient floating turbine and power generation system of claim 1, wherein the upper surface of said at least two tanks are just above the fluid level.

3. The velocity gradient floating turbine and power generation system of claim 1, wherein said blades of the velocity gradient floating turbine are concave and have greater breadth at top than at bottom.

4. The velocity gradient floating turbine and power generation system of claim 1, further comprises a wind turbine optionally mounted on said at least two tanks and connected to a gas compressor through a gear wherein said wind turbine rotates due to the flow of the wind; wherein said gas compressor and said gear are same or different as claimed in claim 1.

5. The velocity gradient floating turbine and power generation system of claim 1, wherein said velocity gradient turbine is the turbine selected from a set of steam turbines, gas turbines, transonic turbines, contra—rotating turbines, statorless turbine, ceramic turbine, shrouded turbine, shroudless turbine, bladeless turbine, water turbine, wind turbine, curtis turbine, rateau turbine, and any combinations thereof.

6. The velocity gradient floating turbine and power generation system of claim 1, wherein said turbine is a water turbine selected from a set of pelton turbine, francis turbine, kaplan turbine, turgo turbine and class flow turbine, and any combinations thereof.

7. The velocity gradient floating turbine and power generation system of claim 1, wherein said turbine of the turbine—generator sub-system is the turbine selected from a set of steam turbines, gas turbines, transonic turbines, contra—rotating turbines, statorless turbine, ceramic turbine, shrouded turbine, shroudless turbine, bladeless turbine, water turbine, wind turbine, curtis turbine, rateau turbine, and any combinations thereof.

8. The velocity gradient floating turbine and power generation system of claim 1, wherein said gas compressor is a gas compressor selected from a set of positive displacement compressor, dynamic compressor, rotary compressor, reciprocating compressor, axial compressor, centrifugal compressor, lobe compressor, screw compressor, liquid ring compressor, scroll compressor, vane compressor, diaphragm compressor, double acting compressor, single acting compressor, and any combinations thereof.

9. A method of working of velocity gradient floating turbine and power generation, comprising the steps of
   a. flowing of fluid into a conical passage formed between two adjacent floating tanks;
   b. guiding of the fluid flow on to concave side of blades of the velocity gradient turbine by guide vanes;
   c. rotating the velocity gradient turbine by the fluid flow,
   d. rotating of a turbine gear which further rotates a compressor gear;
   e. compressing gas by a gas compressor;
   f. encompassing of the compressed gas in the floating tanks;
   g. flowing of the compressed gas through a pipe to a turbine—generation sub-system;
   h. rotating the turbine of the turbine—generation sub-system by the compressed gas; and
   i. initiating power generating process.

* * * * *